April 24, 1951  J. T. KAGEL, SR  2,550,271
FISHING LINE REEL
Filed July 2, 1948

INVENTOR.
JOHN T. KAGEL, SR.
BY
McMorrow, Berman & Davidson
ATTORNEYS.

Patented Apr. 24, 1951

2,550,271

UNITED STATES PATENT OFFICE 2,550,271

FISHING LINE REEL

John T. Kagel, Sr., Jamaica, N. Y.

Application July 2, 1948, Serial No. 36,742

1 Claim. (Cl. 242—84.6)

This invention relates to improvements in fishing line reels and more particularly to an improved, spinning type reel having its rotational axis disposed longitudinally of the fishing rod while the line is being unreeled during a cast and disposed transversely of the rod for rewinding.

It is among the objects of the invention to provide an improved, spinning type reel having a special spool upon which the fishing line is wound for sale and which may be easily assembled with and disassembled from a suitable support so that a worn line and spool may be discarded simultaneously and a new spool, with a new line wound thereon, substituted for the discarded line and spool, which reel is simple in construction, easy to use and economical to manufacture and in which each disposable spool is provided with means cooperating with a support carried element to provide an effective clicker and drag assembly for the reel.

Figure 1:
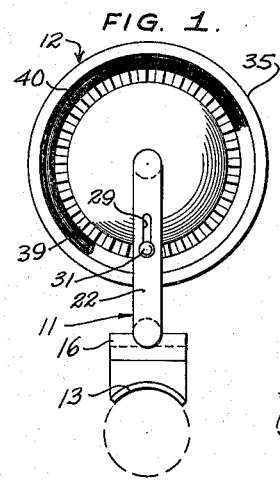
Figure 2:
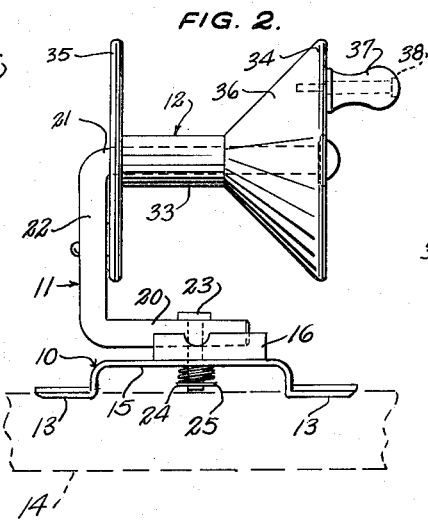
Figure 3:
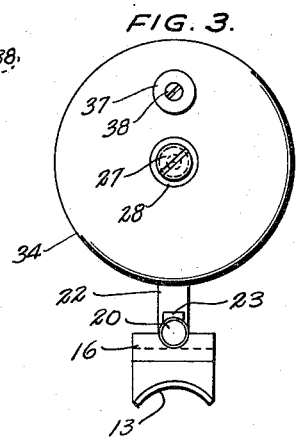
Figure 4:
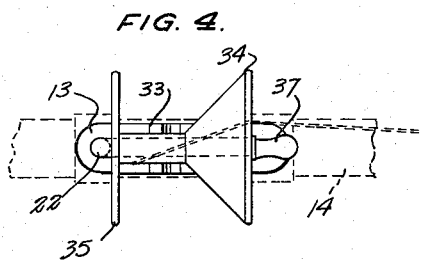
Figure 5:
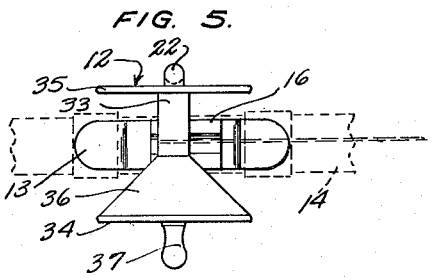
Figures 6, 7, 8:
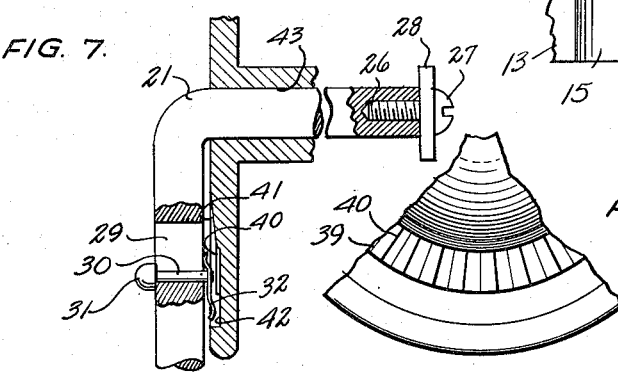

Other objects and advantages will become apparent from a consideration of the following description in conjunction with the accompanying drawing wherein:

Figure 1 is a rear elevation of a spinning type fishing line reel illustrative of the invention, Figure 2 is a side elevation of the reel illustrated in Figure 1, Figure 3 is a front end elevation of the improved reel, Figure 4 is a top plan view of the improved reel on a reduced scale showing the reel in operative position for unwinding the line therefrom, Figure 5 is a top plan view similar to Figure 4 showing the reel in operative position for rewinding or reeling in the line, Figure 6 is a top plan view on an enlarged scale of a reel support block, Figure 7 is a transverse cross section on an enlarged scale of a fragmentary portion of a reel showing a structural detail, and Figure 8 is an elevation on an enlarged scale of a fragmentary portion of the rear end of the reel spool.

The improved reel comprises, in general, a base 10, a stand 11 and a spool 12.

The base 10 comprises a thin walled U-shape member having its end portion 13 extended outwardly and transversely curved to fit upon the surface of a fishing rod 14 of generally circular cross sectional shape. These end portions 13 are secured to the rod by suitable clips, of conventional construction, not illustrated. The U-shaped member has between the end portions 13 a bight portion 15 provided with an aperture and the base further includes a rectangular block 16 secured upon the upper surface of the bight 15 and provided with an aperture registering with the aperture in the bight. The upper surface of the block 16 is provided with two grooves 17 and 18 of partly circular cross sectional shape and disposed perpendicular to each other and intersecting at the aperture 19 which extends through the block.

The stand 11 comprises a U-shaped member formed from a rod of circular cross section and has a lower leg 20, an upper leg 21 and a bight portion 22 connecting the two legs at corresponding ends of the latter, both of the legs 20 and 21 extending outwardly in the same direction from the bight portion 22 substantially perpendicular to the latter. The lower leg 20 is provided with a transverse aperture therethrough and a headed pin 23 extends through the aperture in the lower leg of the stand and through the apertures in the block 16 and the bight portion 15 of the base. A coiled compression spring 24 surrounds the end of the pin 23 between an abutment pin 25 extended transversely through the pin near the lower end thereof and the under surface of the bight 15 to resiliently urge the pin downwardly and releasably hold the leg 20 of the stand in one or the other of the grooves 17 or 18. The upper leg 21 of the stand is provided in its outer end with a concentric, internally screw threaded well 26 which receives a threaded screw 27 for securing an abutment washer 28 on the outer end of the upper leg. The bight portion 22 of the stand is provided intermediate its length with an elongated, longitudinally extending slot 29 and a pin 30 extends through this slot with a head 31 on its outer end and a resilient finger 32 on its inner end, the resilient finger being in the form of a flat, longitudinally curved leaf spring.

Spool 12 comprises a cylindrical, intermediate spindle portion 33, a front flange 34 at the front end of the intermediate portion 33 and a rear flange 35 at the rear end of the intermediate portion. The front flange 34 includes a conical surface 36 extending from the periphery of the flange to the adjacent end of the cylindrical intermediate portion 33 to facilitate unreeling the line from the spool, as particularly illustrated in Figure 4. A winding handle 37 is rotatably secured to the front face of flange 34 by a suitable pin 38 and projects forwardly from the front face of the flange substantially perpendicular thereto. Rear flange 35 is a thin walled disc-shaped body and has in its rear or outer surface an annular concentric groove 39, a series of annular spaced apart clicker teeth 40 in the intermediate portion of the groove and a beveled surface 41 in the inner portion of the groove, the outer portion of the groove being deepened, as indicated at 42. The spool is provided with a concentric bore 43 extending through both flanges and the cylindrical intermediate portion 33 which bore receives the leg 21 of the stand 10 so that the leg of the stand serves as a spool shaft rotatably supporting the spool. The spool is releasably secured on the leg or shaft 21 by the abutment washer 28 bearing against the front face of the front flange 34 of the spool and secured to the stand leg 21 by the screw 27.

The pin 30 is slidable but non-rotatable in the slot 29 and the resilient finger 32 has an outwardly curved lower end portion which, when the pin 30 is in its lowermost position, is received in the deepened portion 42 of the groove 39 in the spool flange 35 so that the finger does not contact the spool or impose any drag thereon. When the pin 30 is slid upwardly to an intermediate position the lower end of the resilient finger 32 contacts the clicker teeth 40 to provide a clicker drag for the spool and when the pin is pushed upwardly to its upper limiting position the lower end of the resilient finger frictionally engages the beveled surface 41 of the groove to provide a friction brake of drag against rotation of the spool on the spool shaft 21.

The spool 12 is preferably a unitary body formed of some suitable material such as synthetic resin, plastic or wood, and is so economical to manufacture that it may be manufactured and sold as a carrier for new fishing line. With this arrangement when a new line is needed the line is purchased pre-wound on a new spool 12. The worn line and the corresponding spool is simply removed from the reel support by taking out the screw 27 and removing the abutment washer 28 after which the new spool with the new line wound thereon is placed on the leg or shaft 21 and the screw and washer replaced to retain the new spool on the support.

For convenience in packing, the pin 28 is preferably screw threaded and the pin and winding handle 37 may be packed in the bore of the spool before sale of the article and may be removed from the bore and operatively assembled with the spool at the time the spool is mounted on the shaft 21 of the stand 11.

When mounted on the spool shaft or leg 21 the spool is easily movable from its unreeling position in which its rotational axis as disposed longitudinally of the rod 14, as illustrated in Figure 4, to its winding position in which its rotational axis is disposed transversely of the rod, as illustrated in Figure 5, by twisting the stand 11, thereby compressing spring 24 sufficiently to permit movement of the lower leg 20 of the stand from the groove 18 to the groove 17.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed is:

A spinning type fishing line reel comprising a support mountable on a fishing rod and including a spool receiving shaft and a movably mounted resilient finger, a spool having a concentric shaft receiving bore rotatably mounted on said shaft, and shaft carried means releasably securing said spool on said shaft, said spool comprising a cylindrical intermediate portion, a front end flange including a conical surface tapering from the periphery of said flange to the adjacent end of said intermediate portion, a winding handle secured to and extending outwardly from the outer face of said front end flange, and a rear end flange at the rear end of said intermediate portion having in its rear face a circular concentric groove with angularly spaced apart clicker teeth therein cooperating with said resilient finger to provide a clicker for said reel and with a beveled, circular surface cooperating with said resilient finger to provide a friction drag for said reel.

JOHN T. KAGEL, Sr.

REFERENCES CITED

The following references are of record in the file of this patent:

UNITED STATES PATENTS

| Number | Name | Date |
|---|---|---|
| 1,114,084 | Weils | Oct. 20, 1914 |

FOREIGN PATENTS

| Number | Country | Date |
|---|---|---|
| 183,277 | Great Britain | July 22, 1922 |
| 795,401 | France | Jan. 6, 1936 |